United States Patent [19]
Ariga et al.

[11] 4,193,483
[45] Mar. 18, 1980

[54] LATCH OPERATED COIL SPRING CLUTCH

[75] Inventors: Masao Ariga, Kawasaki; Hiroyuki Hattori, Inagi; Katsuichi Shimizu, Hoya; Hirotoshi Kishi, Tokyo; Hiroshi Ogawa, Kawasaki; Takahiko Amanuma, Tokyo; Kazumi Umezawa; Seiji Sagara, both of Kawasaki, all of Japan

[73] Assignee: Canon Kabushiki Kaisha, Tokyo, Japan

[21] Appl. No.: 841,209

[22] Filed: Oct. 11, 1977

[30] Foreign Application Priority Data

Oct. 22, 1976 [JP] Japan .................. 51-127493

[51] Int. Cl.² .................................. F16D 13/08
[52] U.S. Cl. .................. 192/26; 192/12 BA; 192/33 C; 192/81 C; 188/85
[58] Field of Search .............. 192/26, 33 C, 12 BA, 192/22, 33 R, 81 C, 81 R; 188/85

[56] References Cited

U.S. PATENT DOCUMENTS

| Re. 25,229 | 8/1962 | Sacchini et al. | 192/26 |
|---|---|---|---|
| 2,298,970 | 3/1941 | Russell et al. | 192/33 C |
| 2,883,022 | 4/1959 | Clausing et al. | 192/26 |
| 2,885,042 | 5/1959 | Frechette | 192/12 BA |
| 2,885,896 | 5/1959 | Hungerford et al. | 192/12 BA |
| 3,048,050 | 8/1962 | Perryman | 192/12 BA |
| 3,104,745 | 9/1963 | Wipke | 192/26 |
| 3,349,880 | 10/1967 | Baer | 192/12 BA |
| 3,493,088 | 2/1970 | Hoff | 192/26 |
| 3,877,554 | 4/1975 | Wojtowicz | 192/12 BA |
| 3,905,458 | 9/1975 | Mehrbrodt | 192/26 |
| 3,985,212 | 10/1976 | Gershnow et al. | 192/26 |
| 3,990,554 | 11/1976 | Lowery | 192/26 |

OTHER PUBLICATIONS

IBM Technical Disclosure Bulletin, A. B. Rosenthal, vol. 13, No. 11, Apr. 1971, p. 3439.

*Primary Examiner*—C. J. Husar
*Assistant Examiner*—David C. Reichard
*Attorney, Agent, or Firm*—Fitzpatrick, Cella, Harper & Scinto

[57] ABSTRACT

A spring clutch device includes a driving side clutch shell, a driven side clutch shell opposed to and coaxial with the driving side clutch shell, a clutch spring disposed in a tight manner over the two clutch shells, a stop member disposed coaxially with the clutch shells and engaged with one end of the clutch spring to control the action of the clutch spring, and a control member for acting on the stop member, there are formed projections on the circumference of the stop member, in an axially and circumferentially staggered relationship, and the control member is selectively displaceable to positions corresponding to the projections for engagement and disengagement with the projections, thereby controlling ON-OFF of the clutch.

2 Claims, 14 Drawing Figures

LATCH OPERATED COIL SPRING CLUTCH

BACKGROUND OF THE INVENTION

1. Field of the Invention

This invention relates to a spring clutch device for permitting ON-OFF control of a drive mechanism, and more particularly to a spring clutch device for controlling the stop position of a cam member which controls paper feed in a copying machine or the like.

2. Description of the Prior Art

Gear clutches, friction clutches, and electromagnetic clutches, etc. have heretofore been utilized to permit ON-OFF control of a drive device, but all of these clutches have been of the type in which a clutch element is displaced to effect its change-over operation and required great forces for effecting the change-over and for holding the changed position. These controls have led to the tendency toward larger size of the clutches.

It has therefore been considered to eliminate such disadvantage by utilizing spring clutches instead of these clutches. For example, one of such spring clutches is disclosed in our U.S. Pat. No. 3,729,077, whereas these clutches have been complex in construction and offered problems in terms of reliability and cost.

SUMMARY OF THE INVENTION

In view of the above-noted points, an object of the present invention is to provide a spring clutch which is simple in construction and highly reliable in operation with reduced possibility of failure and which is low in cost.

According to the present invention, the spring clutch device comprises a driving side clutch shell, a driven side clutch shell opposed to and coaxial with the driving side clutch shell, a clutch spring disposed in a tight manner over the two clutch shells, a stop member disposed coaxially with the clutch shells and engaged with one end of the clutch spring to control the action of the clutch spring, the stop member having projections formed on the circumference thereof in an axially and circumferentially staggered relationship, and a control member selectively displaceable to positions corresponding to the staggered projections to act on the stop member to thereby control the engagement and disengagement thereof with the driven side clutch shell.

Other objects of an embodiment to which the present invention is applied will be mentioned below.

The present device intends to provide a compact copying machine of high performance. Particularly, it provides a compact copying machine which is of the desk-top type and yet can perform a diversity of functions by sophisticatedly utilizing a microcomputer (micro processor).

The present device also intends to guide and drive a reciprocable optical system having respective portions thereof movable at a velocity ratio of 1:2 with high accuracy and stability, by sophisticatedly utilizing special rectilinear guide parts, and to realize such system at low cost.

The present device further intends to provide a method of using an illumination lamp in common in a dual mode machine as is covered by our already filed application and to realize it reliably and inexpensively.

The present device relates to improvements in guide plates in a copying machine. Particularly, it relates to the guide plate disposed short of register rollers and intends to provide a guide plate which ensures a loop for timing to be formed stably.

The invention will become more fully apparent from the following detailed description thereof taken in conjunction with the accompanying drawings.

DESCRIPTION OF THE PREFERRED EMBODIMENTS

Figure 1:
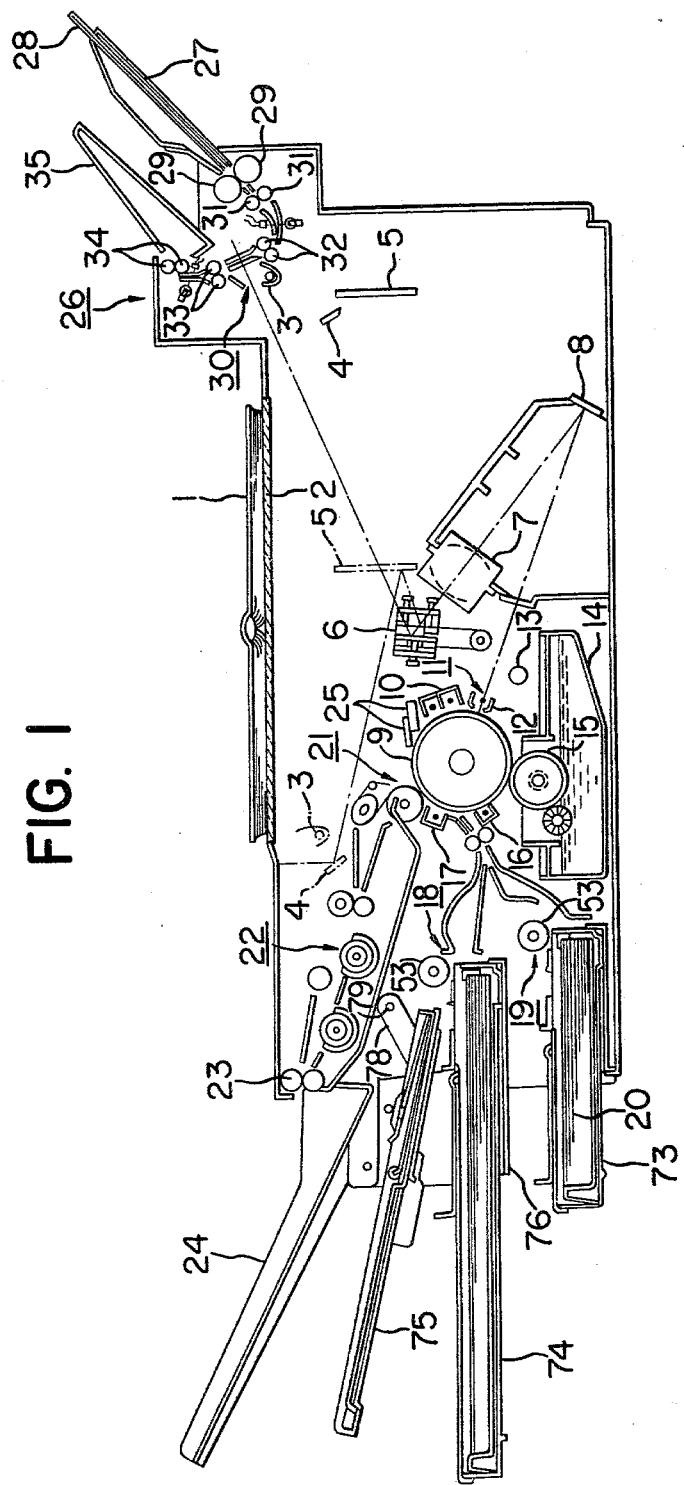
FIG. 1 is a cross-sectional view of a copying machine to which the present invention is applied.

Description will first be made of an embodiment of the copying machine to which the present invention is applicable, with reference to the drawings. An original 1 to be copied is placed on an original carriage glass plate 2 constituting an original supporting surface on top of the machine housing. The original is slit-exposed by an optical system comprising an illumination lamp 3, a first mirror 4 movable with the lamp, a second mirror 5 movable in the same direction as but at half the velocity of movement of the first mirror 4, a change-over mirror 6, a lens 7 and a stationary mirror 8, whereby the image of the original is focused on a drum 9.

The surface of the drum 9 is formed as a photosensitive surface and electrically charged by a charger 10. Subsequently, the charged portion of the drum reaches an exposure station 11, in which the photosensitive medium is exposed to the original image and subjected to corona discharge by a discharger 12, simultaneously.

Next, the photosensitive medium is subjected to the whole surface exposure by a whole surface exposure lamp 13 to thereby form an electrostatic latent image on the drum surface (photosensitive medium), whereafter the drum enters a developing device 14.

Development is carried out by a developing roller 15. Thereafter, excess developing liquid is squeezed for removal by a post-charger 16.

By a transfer charger 17, the image formed on the drum 9 is then transferred to a sheet of copy paper 20 fed there from a supply station 18 or 19. After the image transfer has been done, the copy paper is separated from the drum 9 at a separating station 21 and directed to a fixing station 22, where the image is fixed on the copy paper, which is then discharged onto a tray 24. In the meantime, the drum surface is cleaned for removal of any residual toner thereon by a blade 25 urged against the drum surface (photosensitive surface), whereby the drum becomes available for another cycle.

Where a thick original is to be copied, the change-over mirror 6 is in its position indicated by the dot-and-dash line. If the change-over mirror 6 is moved to its solid-line position and the movable mirrors 4, 5 to their rightmost positions (solid-line positions), an automatic sheet original feed device 26 may be adopted. In this case, an original passing through an exposure station 30 is illuminated by the lamp 3 and the image thereof is focused on the drum 9 by the change-over mirror 6, lens 7 and stationary mirror 8. This lamp 3 is usable in common for thick originals and sheet originals (as will further be described). An uppermost one of sheet originals 28 resting on the original supporting table 27 of the automatic sheet original feed device 26 is separated and transported by a series of feed rollers 31, 32, 33, 34 and through the exposure station 30 onto an original reception tray 35.

Figure 2:
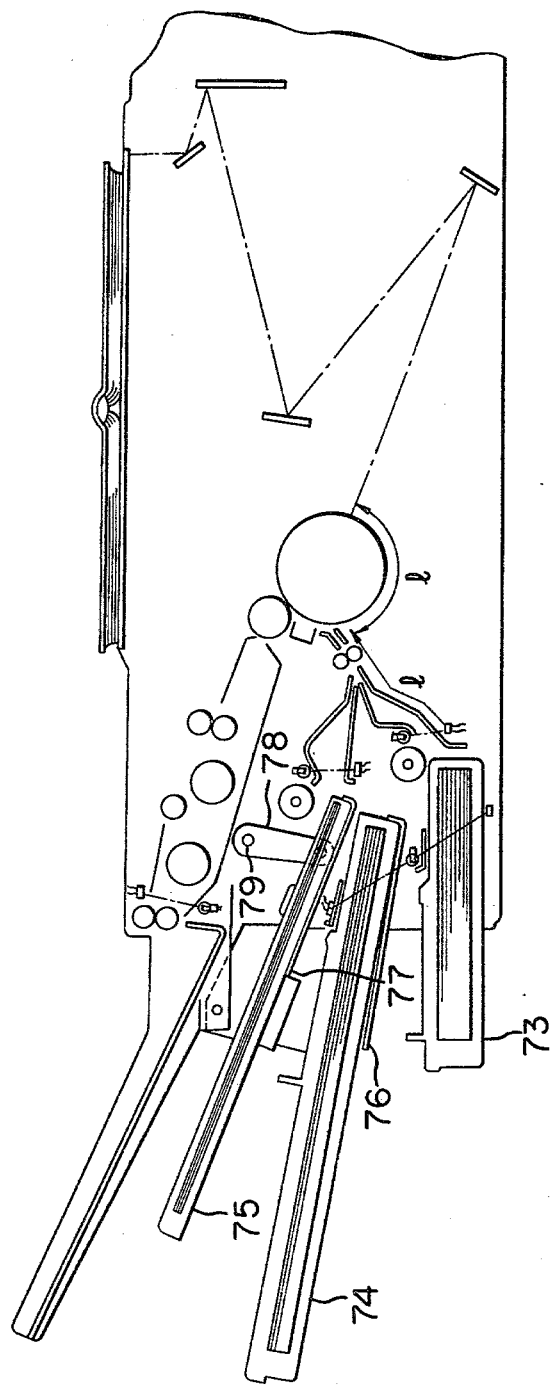
FIG. 2 is a cross-sectional view of the same copying machine when manual paper feed is effected.

Reference is now had particularly to FIGS. 1 and 2. FIG. 1 shows the machine in a position in which either of a main cassette 73 or a subcassette 74 is used. By change-over of buttons, it is possible to select the operation of an upper or a lower paper feed roller 53.

FIG. 2 shows the machine in a position in which a manual feed cassette 75 is used. A cassette receptacle 77 is pivotally mounted on a shaft 79 fixed to the machine body. The manual feed cassette 75 is slidably mounted on the cassette receptacle 77, with one end thereof being secured to the shaft 79 supported to the machine body by means of a link 78. The shaft 79 is rockable by a motor and the position thereof may be selected by change-over of buttons.

Paper detecting elements (lamp and photoreception element) are disposed in the copy paper path corresponding to the distance 1 between the image transfer station and the exposure station, as shown in FIG. 2. The reversal of the optical system is effected by the trailing end of the paper. The control thereof will later be described.

FIGS. 3 to 7 illustrate the guide and illuminating sections of the optical system.

Figure 4:
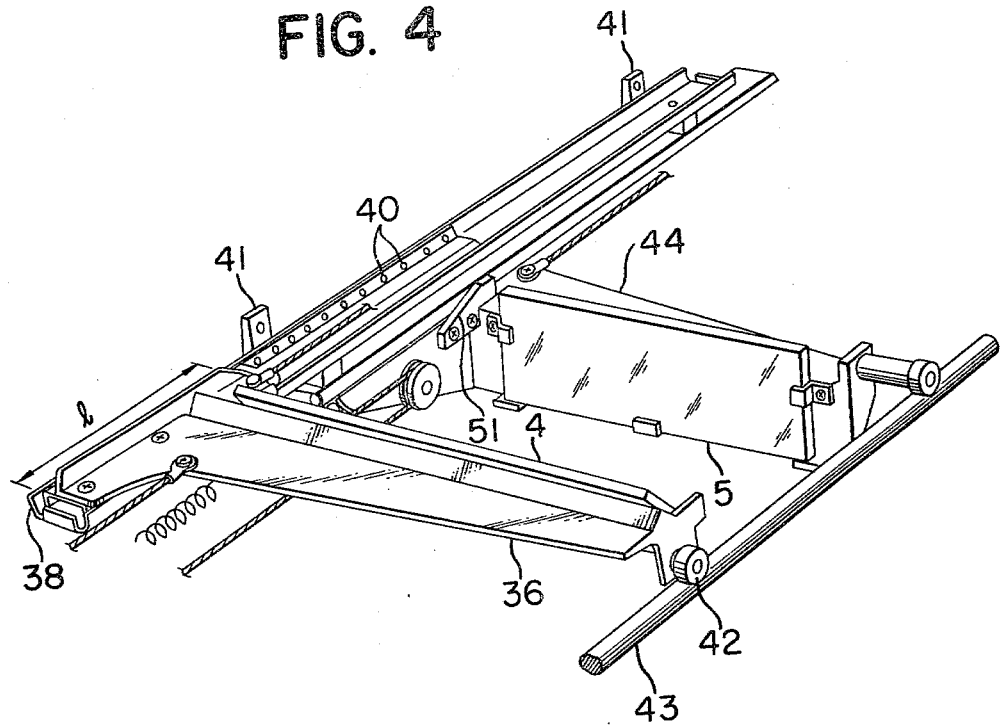
FIG. 4 is a perspective view thereof.
Figure 5:
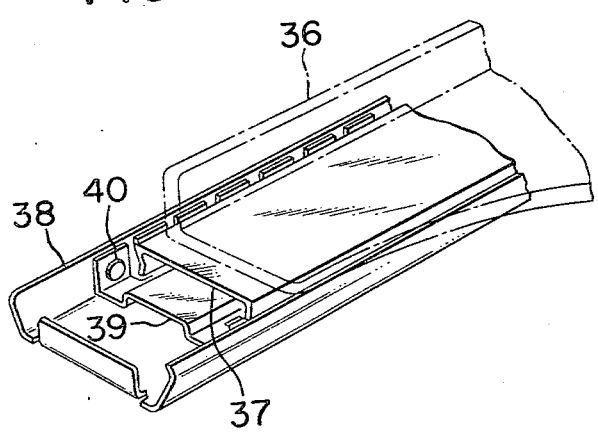
FIG. 5 is a perspective view of an "Accuride".

The first mirror 4 is fixed to a bed member 36 for holding the same. This bed member is coupled to an inner member 37 for rectilinear guide commercially available under the tradename of "Accuride", as shown in FIG. 5, comprises a number of rollers 40 disposed in two rectilinear spaces defined by grooves of inner member 37 and outer member 38, respectively, and held in such spaces against slip out by retainers 39, and the inner member 37 may be rectilinearly guided relative to the outer member 38. The spaces in which the rollers 40 are disposed are slightly narrower than the outside diameter of the rollers 40 so that preliminary pressure may be exerted on the rollers 40. Thus, the outer member 38 and the inner member 37 can be guided relative to each other without any backlash therebetween. As shown in FIG. 4, the outer member 38 covers the stroke of the first mirror 4 and is attached to the machine frame (not shown) by means of support members 41. The inner member 37 is only as long as the mounting portion of the first mirror bed member 36, but may be guided to the other end of its stroke in such a fashion that it rides on the multiple rollers 40 one after another. On this end of the bed member (as viewed in FIG. 4), a roller 42 is mounted and rides on a rail 43 secured to the machine body.

Figure 8:
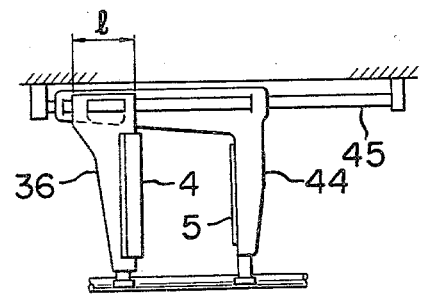
FIG. 8 is a front view of the optical system direct guide according to the prior art.

The second mirror 5 is secured to its support member 44 which in turn is secured to the inner member 37 of the downwardly secured "Accuride". The rectilinear guide of the conventional type is schematically shown in FIG. 8. This type of guide is such that mirror supporting beds 36 and 44 are rectilinearly guided by a round rod-like rail 45 fixed at their opposite ends. According to this system, (1) the rail 45 is low in rigidity because it can only be supported at opposite ends; (2) in order to avoid the interference of the mirror supporting beds 36 and 44, the span 1 of the receiving portion of the first mirror supporting bed 36 in particular becomes shorter; and (3) backlash between the round rod and the plain bearing slidably fitted thereon is unavoidable, so that accurate and stable movement of the mirror is impossible. According to the present invention, (1) any portion of the "Accuride" can be coupled to the machine body (namely, can be rigidly fixed); (2) the "Accuride" itself is large-dimensioned and of great section modulus; (3) the support portion of the "Accuride" and the receiving portions of the first and second mirror supporting beds make no interference, so that a sufficiently large span 1 can be secured for the receiving portions of the supporting beds; and (4) as already noted, no backlash is present between the inner member and the outer member, so that the mirrors can be reciprocated with high accuracy and stability.

Figure 3:
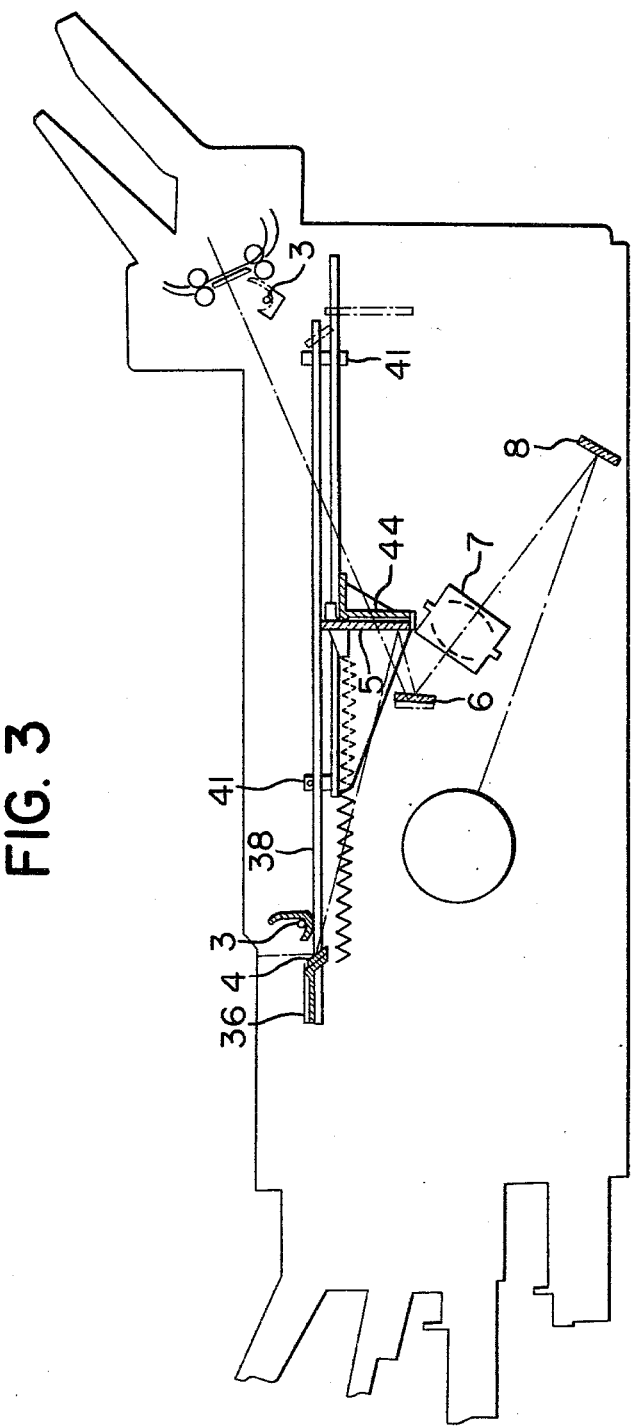
FIG. 3 is a cross-sectional view showing an optical system guide portion.
Figure 6:
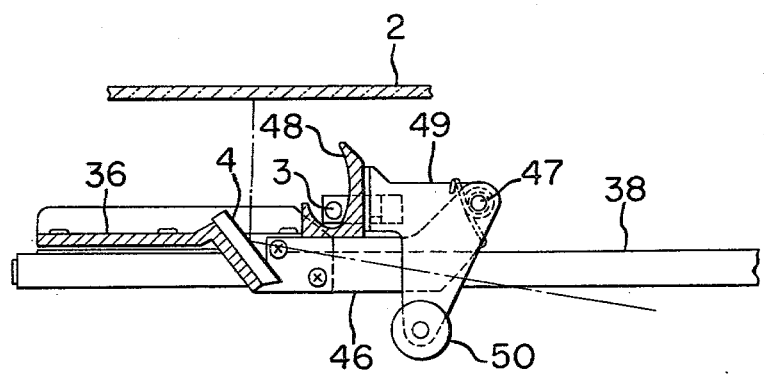
FIGS. 6 and 7 show details of the illuminating station.
Figure 7:
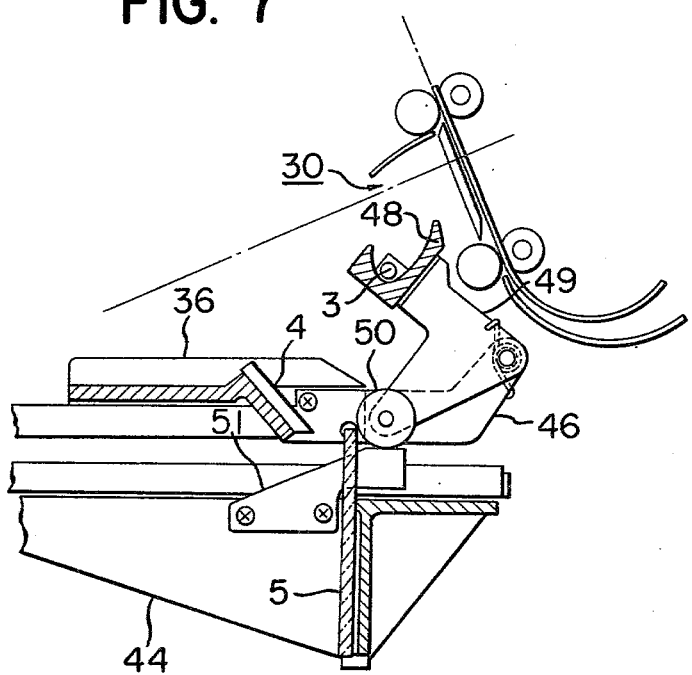

In FIG. 3, the position shown by solid lines is the home position. As already noted, the first and second mirrors 4 and 5 are moved rightwardly to scan the original, and then returned to the home position by the force of a spring 45. When the button of the automatic sheet original feed device is depressed, the mirrors 4 and 5 are moved to their rightmost positions indicated by phantom lines, and locked at such positions (as will further be described). At the same time, the lamp 3 is moved to a position for illuminating the sheet original. Details of this portion are illustrated in FIGS. 6 and 7. FIG. 6 shows the position in which the original on the original carriage glass plate 2 is being scanned. A pivot shaft 47 is secured to a support arm 46 fixed to the mirror supporting bed 36, and the illumination lamp 3, reflector 48 and support follower 49 are similarly designed for pivotal movement about the pivot shaft 47. Attached to one end of the support follower 49 is a roller 50 so as to act as a follower. In FIG. 6, there are shown details of the neighborhood of the first mirror 4 during copying of a thick original. FIG. 7 shows details of the neighborhood of the illuminating section during operation of the automatic sheet original feed device. As the first and second mirrors 4 and 5 are moved to their rightmost positions, these mirrors come nearer to each other due to the difference between their velocities. A cam plate 51 is secured to the support member 44 of the second mirror 5, and a roller 50 follows the camming surface of the cam plate 51, whereby the illumination lamp 3 and reflector 48 are caused to face a sheet original exposure station 30.

FIGS. 9, 10, 11 and 12 illustrate details of the paper supply station. A paper feed roller 53 is fixed to its shaft 54 which in turn is journalled to an arm 55. Secured to the arm 55 is a pivot shaft 56, which is journalled to the body frame. Thus, the paper feed roller 53 is rockable about the shaft 56. A spring 57 is hooked to the arm 55 to bias the same upwardly. Mounted on the shaft 54 is a follower roller 58 which serves as the follower of a cam 59. The cam 59 is controlled by a one-rotation clutch which is adapted to effect a temporary stop on its way.

This will be described by reference to FIGS. 11 and 12. The shaft 60 of the cam extends through a frame 61 and is journalled thereto. The input to this cam shaft passes from a motor through a belt 62 to a pulley 63. A spring clutch comprising a shell portion $63_1$ of the pulley 63, a clutch drum 64, secured to the shaft 60 a clutch spring 65 and a stop ring 66, is controlled by a solenoid 67. When the solenoid 67 is not energized, a lever 68 assumes its position indicated by solid line in FIG. 11, wherein one of the projections, $66_1$, of the stop ring 66 is engaged with the lever 68, whereby the clutch is in OFF position. When the solenoid 67 is energized, the lever 68 comes to its position 68' indicated by phantom line, whereby the lever becomes disengaged from the projection $66_1$ to bring the clutch into its ON position to rotate the cam 59. However, when about 180° of rotation has been made, another projection $66_2$ comes into engagement with the lever 68' to thereby bring the clutch again into its OFF position. At this time, the paper feed roller 53 is depressed by the cam 59 to assume its position indicated by phantom line 53' in FIG. 9.

When the roller 53 comes to such depressed position, a friction pulley 69 (FIG. 10) secured to one end of the paper feed roller shaft 54 comes into contact with a normally driven capstan 70 (FIG. 9 and 10) to thereby drive the paper feed roller 53.

Figure 11:
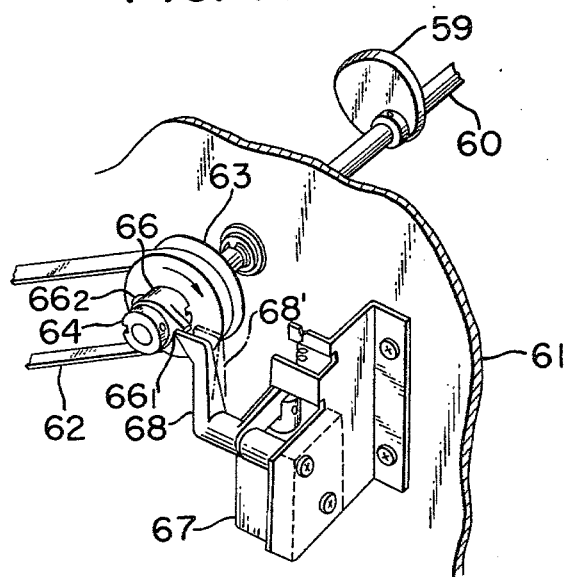
FIG. 11 shows, in perspective view, a paper feed timing control mechanism.
Figure 12:
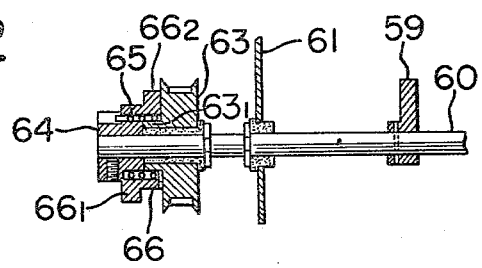
FIG. 12 is a cross-sectional view thereof.
Figure 13:
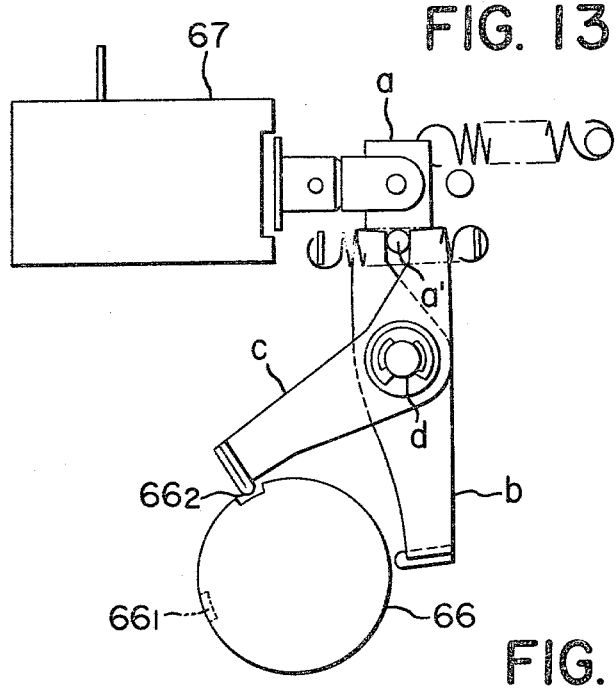
FIG. 13 shows, in cross-section, the paper feed control mechanism according to the prior art.

When the solenoid 67 is deenergized, the lever 68' is released from its engagement with the projection $66_2$ to bring the clutch again into its ON position and permit a further 180° of rotation, whereupon the position as shown in FIG. 11 is restored, thus bringing the clutch into its OFF position. The clutch spring 65 has one end hooked to the stop ring 66 and the other end hooked to the clutch drum 64, so that the relativity between the projections $66_1$, $66_2$ of the stop ring 66 and the cam 59 is not destroyed by repetition of the clutch operation.

Where the cam 59 is designed to stop temporarily on its way in the described manner, the time during which the cam depresses the paper feed roller can be controlled by the time during which the solenoid 67 is energized and this means an increased degree of freedom of design which is useful. An example of the conventional control method for effecting such temporary stop of the cam is illustrated in FIG. 13. In FIG. 13, there is seen a stop ring 66 and its recesses $66_1$ and $66_2$ for enabling the stop ring to be engaged by levers (b) and (c) to stop the stop ring, these levers being pivotable about a pivot (d). A lever (a) having a dowel (a') is also pivotable about the pivot (d) by a solenoid 67 to control the two levers (b) and (c). Although detailed description of the operation of this system is omitted, the present invention is apparently simpler than such conventional system, and accordingly more reliable in operation and lower in cost. The conventional system is lower in reliability and higher in cost because of the balance required between two springs, overlapped precision (tolerance) of some parts and complexity of relative movement of the parts.

Figure 9:
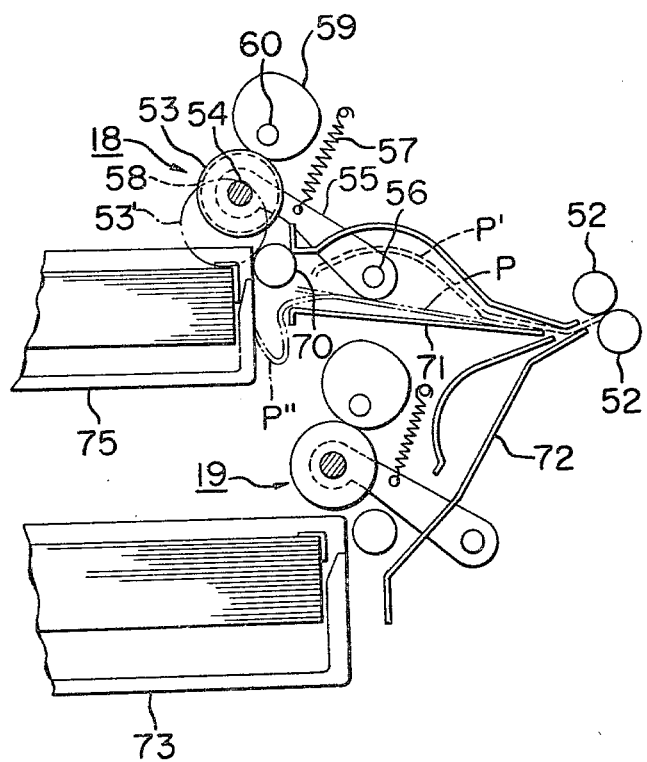
FIG. 9 is a cross-sectional view showing details of the paper supply station.
Figure 10:
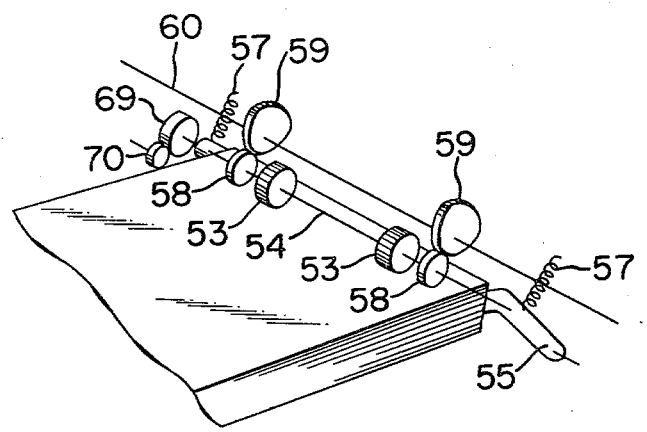
FIG. 10 is a perspective view thereof.
Figure 14:
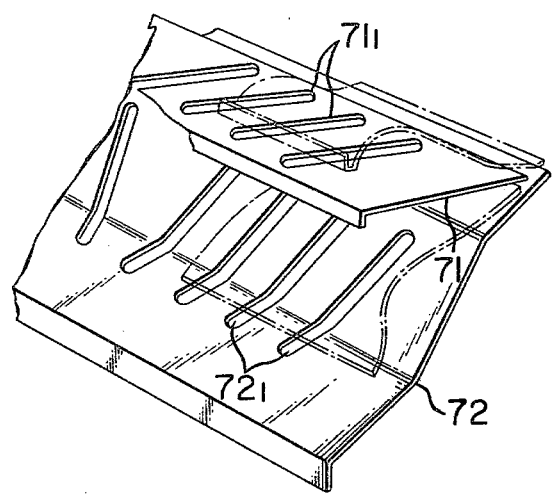
FIG. 14 is a perspective view of a copy paper guide member.

Each sheet of copy paper expelled from the cassette is fed as indicated by dot-and-dash line P in FIG. 9, due to such factors as the direction of expulsion, self-support strength and gravity of the paper, and strikes against a set of register rollers 52 (temporarily stationary) for establishing accurate timing with the machine, to thereby form a loop such as P', whereafter the register rollers 52 start rotating to transport the copy paper. With such a conventional system unreformed, the loop such as P' has often failed to form well and has tended to cause jamming. Minute observation of this would show that the loop inadvertantly forms as indicated by P'', thus causing jammed paper between the cassette and the guide plate 71. This has been found to be attributable to the fact that when the condition of the paper changes from P to P', the space between the paper and the guide plate 71 abruptly expands and the paper remains forced to the position P by the atmospheric pressure unless air is well supplied into such expanded space. For this reason, as shown in FIG. 14, a number of vent holes $71_1$ and $72_1$ are formed in guide plates 71 and 72 (the latter belonging to the lower supply station). This entirely eliminates the trouble as indicated by P''. In FIG. 14, the vent holes for preventing jam of paper are in the form of divergent slots, but a number of circular holes may also result in the same effect.

What we claim is:
1. A spring clutch device comprising:
   a driving side clutch shell;
   a driven side clutch shell opposed to and coaxial with said driving side clutch shell;
   a clutch spring disposed in a tight manner over said two clutch shells;
   a stop member disposed coaxially with said clutch shells and engaged with one end of said clutch spring to control the action of said clutch spring, said stop member having projections formed on the circumference thereof in an axially and circumferentially staggered relationship; and
   a control member selectively displaceable to axial positions corresponding to said axially staggered projections to selectively contact said projections to thereby control the engagement and disengagement thereof with said driven side clutch shell.
2. A spring clutch device according to claim 1, wherein said staggered projections of said stop member are located at positions circumferentially about 180° out of phase with each other.

* * * * *